US007616095B2

(12) United States Patent
Jones et al.

(10) Patent No.: US 7,616,095 B2
(45) Date of Patent: Nov. 10, 2009

(54) ELECTRONIC TOKEN TO PROVIDE SEQUENTIAL EVENT CONTROL AND MONITORING

(75) Inventors: Derek W. Jones, Kirkcudbright (GB); James E. Dogul, Hudson, NH (US); Richard Galera, Nashua, NH (US); George E. Rollins, Chelmsford, MA (US); George K. Schuster, Royal Oak, MI (US); Suresh Nair, Amherst, NH (US); Ray C. Delcher, Oxnard, CA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 655 days.

(21) Appl. No.: 11/360,082

(22) Filed: Feb. 23, 2006

(65) Prior Publication Data
US 2007/0205860 A1    Sep. 6, 2007

(51) Int. Cl.
*H04Q 5/22* (2006.01)

(52) U.S. Cl. .................... 340/10.5; 340/5.61; 340/5.52; 340/10.1

(58) Field of Classification Search .............. 340/825, 340/2.21, 2.6, 5.61, 10.1, 10.5, 825.72, 825.69; 700/8, 11–22, 95, 116, 221, 225, 226, 237
See application file for complete search history.

(56) References Cited

U.S. PATENT DOCUMENTS

| 5,065,507 | A |   | 11/1991 | Wakamori et al. |
| 5,629,981 | A | * | 5/1997 | Nerlikar ........................ 713/168 |
| 5,971,587 | A | * | 10/1999 | Kato et al. .................... 700/115 |
| 6,545,607 | B2 |   | 4/2003 | Bredow |
| 6,644,771 | B1 |   | 11/2003 | Silverbrook |
| 6,735,630 | B1 |   | 5/2004 | Gelvin et al. |
| 6,825,766 | B2 |   | 11/2004 | Hewitt et al. |
| 6,959,229 | B2 | * | 10/2005 | Eidemiller .................... 700/226 |
| 6,975,915 | B2 |   | 12/2005 | Robitaille |
| 7,069,100 | B2 | * | 6/2006 | Monette et al. .............. 700/116 |
| 7,071,825 | B2 | * | 7/2006 | VoBa ........................ 340/572.1 |
| 7,088,220 | B2 | * | 8/2006 | Kotzin ........................ 340/5.82 |
| 7,245,220 | B2 | * | 7/2007 | Haller et al. ............... 340/572.1 |
| 7,336,243 | B2 | * | 2/2008 | Jo et al. ........................ 343/895 |
| 2004/0004119 | A1 |   | 1/2004 | Baldassari et al. |
| 2004/0267395 | A1 |   | 12/2004 | Discenzo et al. |
| 2005/0053687 | A1 |   | 3/2005 | Pitschenader et al. |
| 2005/0110610 | A1 |   | 5/2005 | Bazakos et al. |
| 2005/0125441 | A1 | * | 6/2005 | Clemens et al. ........... 707/103 X |

(Continued)

FOREIGN PATENT DOCUMENTS

WO    2005059667    6/2005

OTHER PUBLICATIONS

International Search Report dated Oct. 3, 2007, mailed Nov. 21, 2007 for U.S. Appl. No. 07/62758, 2 pages.

*Primary Examiner*—Daniel Wu
*Assistant Examiner*—Ryan W Sherwin
(74) *Attorney, Agent, or Firm*—Turocy & Watson LLP; William R. Walbrun

(57) ABSTRACT

The claimed subject matter provides a system and/or a method that facilitates initiating a sequence within an industrial automation environment. A radio frequency identification (RFID) component can receive data from an RFID tag. An event control component can invoke at least one event related to a device in a designated control sequence.

25 Claims, 12 Drawing Sheets

U.S. PATENT DOCUMENTS

2005/0285740 A1   12/2005   Kubach et al.
2006/0028352 A1    2/2006   McNamara et al.
2007/0024463 A1*   2/2007   Hall et al. .............. 340/825.69

\* cited by examiner

ELECTRONIC TOKEN TO PROVIDE SEQUENTIAL EVENT CONTROL AND MONITORING

TECHNICAL FIELD

The claimed subject matter is related to RFID technology, and more specifically to RFID tags utilized within an industrial automation system.

BACKGROUND

An evolving technology that is rapidly gaining interest is Radio Frequency Identification (RFID), which leverages electronic data to mitigate data reading (e.g., scanning bar codes) and/or opening containers to obtain product information. RFID technology leverages electronic data and wireless communications for identification purposes. With RFID systems, electronic data typically is stored within an RFID tag, which can be formed from a small silicon chip and one or more antennas and affixed to a product. Reading from and/or writing to an RFID tag can be achieved through radio frequency (RF) based wireless communication via devices referred to as RFID readers. An RFID reader is a device that can be utilized to read and/or write RFID tag data, depending on read/write privileges.

In general, writing is utilized to add and/or modify product-specific information to an RFID tag, and reading is utilized to retrieve the information, for example, to provide for automatic product identification. In many instances, the electronic data written to and/or read from an RFID tag includes an Electronic Product Code (EPC), as well as other product-related data. The EPC, in general, is a unique number that is encoded (e.g., as a bit code) and embedded within the RFID tag (a small silicon chip with one or more antennas) affixed to an associated product. Typical EPC data can include information about the associated product (e.g., product type, date of manufacture, lot number, source data, destination data, unique product code, . . . ) and/or associated pallets, boxes, cases and/or container levels, for example.

In today's highly sophisticated, complex and intelligent industrial automation systems, RFID technology is becoming an increasingly important presence for logistics concerns, material handling and inventory management. When implementing an RFID solution in a distribution center or a factory, it is customary to utilize three distinct platforms: an RFID reader/antenna (e.g., a fixed implementation), RFID "middleware" software running on a standard PC (Personal Computer), and an industrial controller (e.g., a PLC-Programmable Logic Controller). A traditional communications approach is to have the RFID reader connect to the controller via a network using, for example, RS-232 serial communications, Ethernet, or any of the field buses such as DeviceNet, ControlNet, etc. Thus, data read from the RFID tag can be utilized to provide a greater degree of certainty over what goes into a supply chain, location of various items and/or people, and how to manage raw materials, warehouse inventory, shipments, logistics, and/or various other aspects of manufacturing.

The industrial automation systems can employ complex and oftentimes dangerous equipment in order to effectuate the production of various items. For example, to create an automobile door, sheet metal must be cut in a desired shape by large cutting devices. Moreover, various sequences and/or events must be initiated in a particular order to provide security with the large cutting devices. Typically, mechanical keys and/or locks can be utilized to provide the exchange of physical tokens to enforce a designated sequence. Without adequate safety mechanisms such as enforcing designated sequences, one or more individuals may become seriously injured and/or disfigured by accidentally placing a body part in an improper place at an inopportune time. Thus, many industrial devices are associated with safety mechanisms that provide the enforcement of a designated sequence, an event control sequence, etc.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate employing an event control sequence based at least in part upon an RFID tag. An RFID component can transfer data from an RFID tag via wireless communication, wherein the RFID tag can include data that an event control component can utilize to initiate a designated event control sequence. The event control component can utilize the RFID data as a trigger to initiate at least one event associated with a device within industrial automation environment. It is to be appreciated and understood that the RFID tag can be a passive RFID tag, and in particular a passive UHF tag. The RFID component can be, but is not limited to, various components that read, write, receive, and/or store electronic product data, such as, readers, writers and/or servers, and can be a handheld device, incorporated into a device, a badge, a badge, a pass, an identification card, an access pass, a keycard, a nametag, and a driver's license, an identification item, or a fixed-mount device depending on the particular application and/or location within an industrial automation environment.

The event control component can invoke at least one event associated with a sequence for control of the device, wherein the device can include any suitable device within an industrial automation environment that can pose a threat, danger, and/or hazardous condition. For example, the device can be, but is not limited to, a blade, a door, a press, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc.

In accordance with another aspect of the innovation described herein, the event control component can further include an append component that can manipulate the initial received RFID tag data to allow for a re-transmission of the manipulated data to employ a disparate event associated with a device. The manipulation can be an additional amount of data appended to the received RFID tag data, a re-written code in comparison to the received RFID tag data, and/or any combination thereof. The append component can further allow the sequential order of events based at least in part upon the manipulated code initiates a disparate event from the initial RFID tag data.

In accordance with one aspect of the claimed subject matter, the automation device can be controlled by a controller. The controller can include software and/or hardware components having inputs and/or outputs that can be programmed to deliver/receive automation manufacturing-related data. Moreover, the controller can include an internal database and/or data store that provide storage of data to invoke efficient access to RFID related information.

In accordance with another aspect of the claimed subject matter, the RFID tag can be a passive tag that utilizes ultra high frequency (UHF), wherein a power source is not included on the RFID tag. Moreover, the RFID tag data can include at least one of a tag identification, event data, device data, event control data, monitoring data, user data, extended data, user defined data, reader identification, security data, location data, biometric data, access data, personal data, and automation environment data, etc. The RFID tag can then be associated with a badge, a pass, an identification card, an access pass, a keycard, a nametag, and a driver's license, etc. In other aspects of the claimed subject matter, methods are provided that facilitate implementing an event control sequence related to a device within an industrial automation environment.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
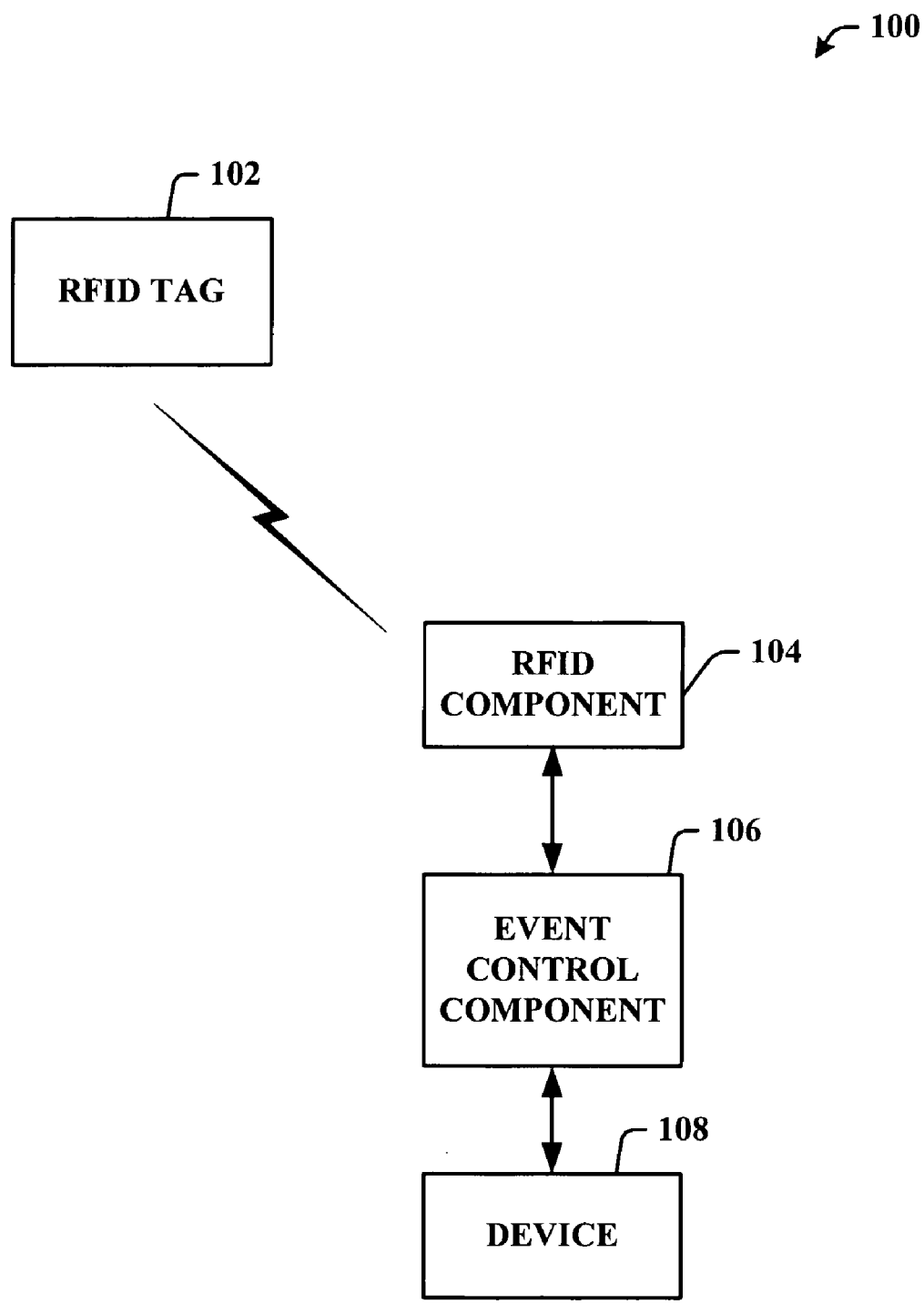
FIG. 1 illustrates a block diagram of an exemplary system that facilitates employing an event control sequence based at least in part upon an RFID tag.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the innovation.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates employing an event control sequence based at least in part upon an RFID tag. An RFID component 104 can transfer data from an RFID tag 102 via wireless communication, wherein the RFID tag 102 can include unique identification data utilized by an event control component 106 to enforce a designated sequence of at least one event related to a device 108. The event control component 106 can implement a particular sequential event control and/or monitoring for the device 108 based at least in part upon the data associated with the RFID tag 102. It is to be appreciated and understood that the RFID tag 102 can be a passive RFID tag, and in particular a passive UHF tag. The RFID component 104 can be, but is not limited to, various components that read, write, receive, and/or store electronic product data, such as, readers, writers and/or servers, and can be a handheld device, incorporated into the device 108, a badge, a badge, a pass, an identification card, an access pass, a keycard, a nametag, and a driver's license, an identification item, or a fixed-mount device depending on the particular application and/or location within an industrial automation environment. The RFID tag 102 can be utilized to provide a unique identification that is authorized to initiate at least one event related to the device based at least in part upon the signal communicated between the RFID tag 102 and the RFID component 104. Moreover, the RFID tag 102 can be utilized to provide access codes, authorization, and/or monitoring (e.g., of the particular events that are to be invoked based on the received data).

It is to be appreciated that the RFID tag 102 can include any suitable data associated with, but not limited to, sequence event control, designated sequences, particular events respective to the device 108, identification, location, biometrics, access, security, personal data, automation environment, etc. This suitable data included with the RFID tag 102 can be utilized by the event control component 106 to incorporate an execution of events in a specific series and/or parallel sequence that is safety critical. For example, a machine shut down and access procedure can be dangerous unless a specific sequence is followed. Thus, the event control component 106 can enforce the specific sequence upon transmission of an authorized unique identification within the RFID tag 102. In another example, environmental damage can result if process pipeline valves are opened and/or closed in an incorrect sequence. Although depicted as a separate component, it is to be appreciated that the RFID component 104 can be a stand-alone component, incorporated into the event control component 106, and/or any combination thereof. Moreover, it is to be appreciated that a plurality of RFID tags 102, RFID component 104, devices 108, and/or event control components 106 can be utilized by the claimed subject matter.

In one example, a system can include various RFID identification badges and/or passes such that each pass or badge utilizes an RFID tag 102 with unique identification data. By employing RFID technology, the unique pass and/or badge identification can allow designated individuals in induce sequential events. Thus, when the badge and/or pass establishes communication or is within a pre-defined range of an RFID component 104, the appropriate RFID tag with the proper identification data can invoke a sequence of control events. For instance, when a person utilizing the badge comes into a room with a hazardous device, a series of events can be employed related to the device in a particular order as necessary.

In addition, the RFID passes and/or badges can include a hierarchy of security rights and/or privileges such that particular devices and/or events can be controlled and/or set in sequence based on such privileges and/or security rights. Thus, the RFID passes and/or badges can be employed to provide automatic invoking of an event to various devices within any location, room, area, zone, plant, factory, etc. Moreover, the RFID passes and/or badges can ensure only pre-designated individuals are employing an event sequence to a device. Furthermore, the system can utilize RFID to provide an additional data collection level, an additional processing level, a supervisory function and/or level, diagnostic function, dynamic, homogeneous, and/or diverse redundancy and state monitoring for integrity enhancement, etc. It is to be appreciated that the system 100 can be a stand-alone system, a module-based system, a central host system, and/or any combination thereof.

It is to be appreciated that the subject innovation includes any suitable technique to provide an electronic triggering of a particular industrial automation control sequence and/or any combination of an electronic triggering and a mechanical triggering of a particular industrial automation control sequence. For instance, the claimed subject matter can include the use of the RFID tag 102 to initiate a designated sequence of an event related to a component. Furthermore, the use of any mechanical triggering (e.g., keys, lock outs, switches, levers, etc.) can be utilized in conjunction with the electronic triggering. In addition, it is to be appreciated that the subject innovation is not so limited to RFID technology but rather any suitable electronic triggering can be employed to initiate a particular control sequence. For instance, the electronic triggering can be any suitable electronic triggering technique such as, but not limited to, frequency modulation (FM), amplitude modulation (AM), infrared, near-field communications (NFC), Ethernet, wireless communication, biometrics (e.g., retinal scan, finger print, inductance, etc.), a switch, a sensor, a safety mat, a light curtain, Bluetooth, cellular communication, hard-wire, universal serial bus (USB), Firewire, etc.

Figure 2:
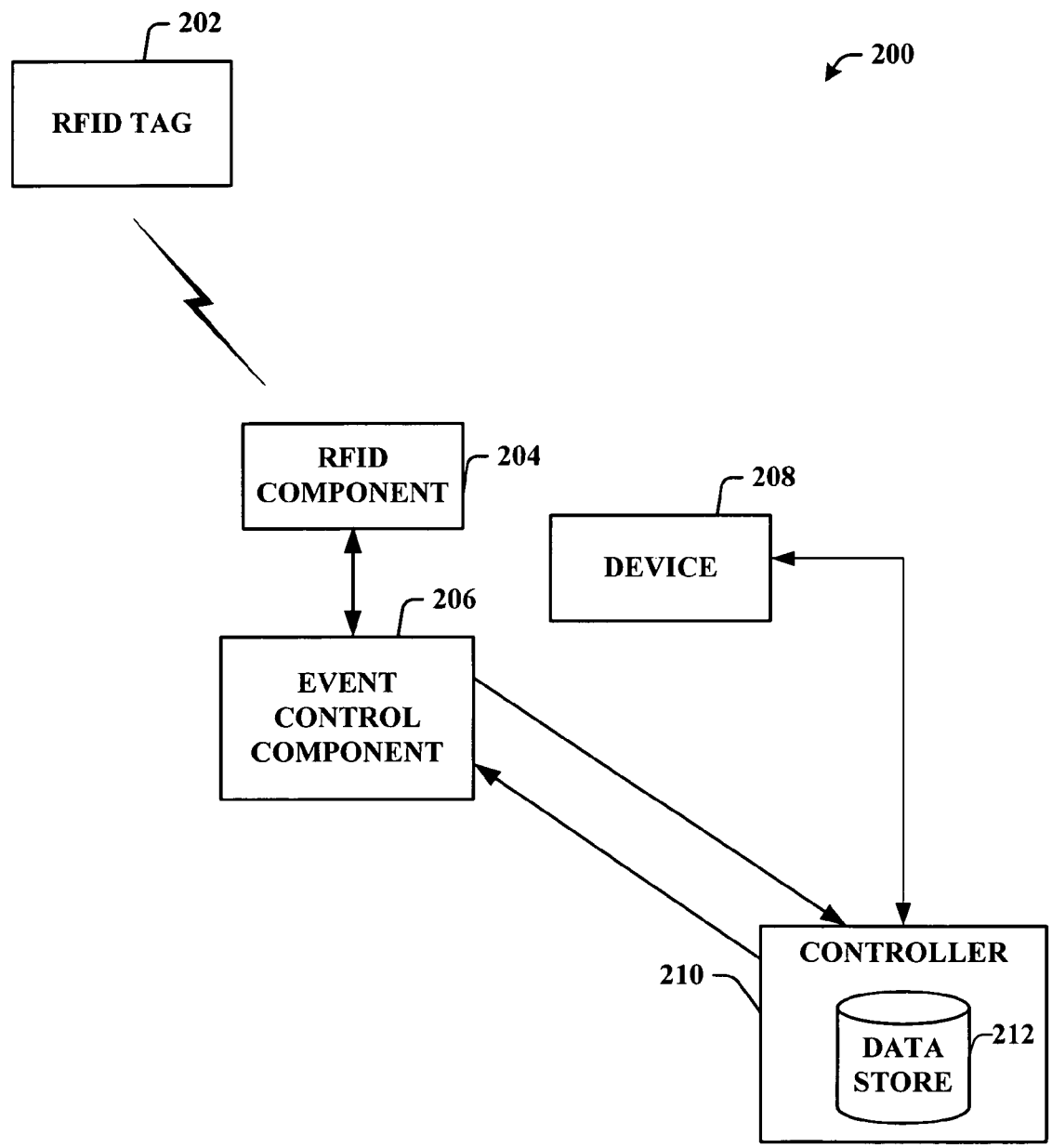
FIG. 2 illustrates a block diagram of an exemplary system that facilitates implementing an event control sequence related to a device within an industrial automation environment.

FIG. 2 illustrates a system 200 that facilitates implementing an event control sequence related to a device within an industrial automation environment. An RFID tag 202 can provide data to an RFID component 204 via wireless communication, wherein an event control component 206 can institute at least one event in a sequential manner to a device 208. The event control component 206 can invoke the event in series, parallel, and/or any combination thereof. Moreover, the event(s) can be, but are not limited to, device shut down, device access procedures, valve sequencing, exhaust sequencing, heat sequencing, device powering up, and/or any other suitable sequential process associated with a device and/or process within an industrial automation environment. Although a single RFID tag 202 and a single RFID component 204 are depicted, it is to be understood and appreciated that any number of RFID tags and any number of RFID components can be utilized with the subject innovation.

The device 208 can include any suitable device within an industrial automation environment that can pose a threat, danger, and/or hazardous condition. For example, the device 208 can be, but is not limited to, a blade, a door, a press, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc.

Furthermore, the device 208 can be controlled by a controller 210. It is to be appreciated that the controller 210 can contain software components and hardware components having inputs and/or outputs that can be utilized in connection with automating an industrial manufacturing device/process. Furthermore, the controller 208 can employ a sequential event to the device 208 based at least in part upon the RFID tag 202 communicating data within a given range and/or proximity to the RFID component 204. It is to be appreciated that the controller 210 can include software and/or hardware components, wherein inputs and/or outputs can be utilized in order to automate an industrial device and/or process. Furthermore, the controller 210 can include a data store 212 that facilitates storing and/or accessing data to achieve efficiency and speed. With the controller 210 having the data store 212, standardization and functionality can be enabled in the manufacturing process and/or automation system.

The data store 212 can utilize common data store technology for representing, configuring, editing, entering, and communicating the data contained therein. It is to be appreciated and understood that the data store 210 can include object oriented methods for structuring data and methods that can be operated on such data. By creating the association of data record types to each other and to functions or business rules that could be programmed on the controller 210, the controller 210 and associated device 208 can accomplish a plurality of jobs beyond conventional system program logic controller (PLC) based automation devices.

In addition, utilizing the data store 212 within the controller 210, the control programming can take advantage of direct access to the stored information for driving decisions, operations, mechanisms, manipulations, and controlling devices. By providing an on-board data store such as the data store 212, the time and/or number of steps required to execute the desired automation functions is greatly reduced. Local automation programming can also advantageously utilize inherent information manipulation capabilities of such system 200 to directly access the data in a form and format more consistent with business data access (e.g., including structured and/or object oriented data representation and addressing).

The data store 212 can store various data related to the system 200, such as, but not limited to, event control sequences, biometric data (e.g., inductance, retina data, iris data, a facial pattern, a hand measurement, a fingerprint, and a voice pattern), access data, security data, historical data (e.g., based on access levels, tracking data, verification data, locations visited, access times, tracking information, event sequences, etc.), usernames, passwords, device listings, controller listings, RFID tag listings, RFID component listings, etc. The data store 212 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 212 of the subject systems and methods is intended to comprise, without being limited to, these and any other suitable types of memory. In addition, it is to be appreciated that the data store 212 can be a server, a database, a hard drive, and the like.

Figure 3:
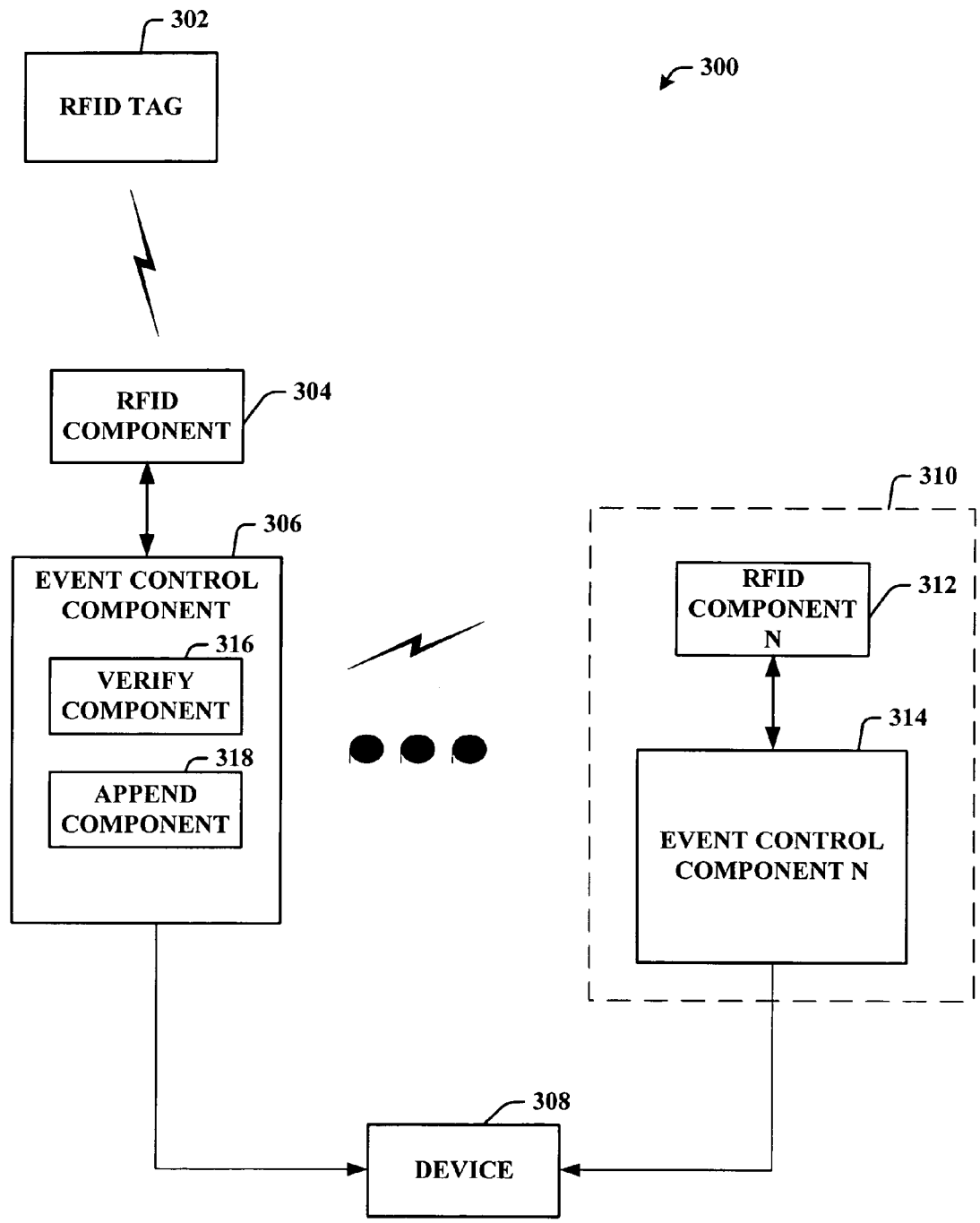
FIG. 3 illustrates a block diagram of an exemplary system that facilitates invoking at least one event related to a control sequence associated with a device utilizing a plurality of RFID signals in series and/or parallel.

FIG. 3 illustrates a system 300 that facilitates invoking at least one event related to a control sequence associated with a device utilizing a plurality of RFID signals in series and/or parallel. One or more RFID tags 302 can wireless transmit data, wherein an RFID component 304 can receive such data. It is to be appreciated that the RFID component 304 can be, but is not limited to, various components that read, write, receive, and/or store electronic product data, such as, readers, writers and/or servers, and can be a handheld device, incorporated into a device, a badge, an identification item, or a fixed-mount device depending on the particular application and/or location within an industrial automation environment. The data can be utilized by an event control component 306 to employ and/or invoke a particular event in a specific sequence, wherein the event is associated with a device 308. It is to be appreciated that the RFID tag 302, the RFID component 304, the event control component 306, and the device 208 can be substantially similar to components, tags, and devices described in previous figures.

The event control component 306 can include a verify component 316 to employ verification techniques to ensure integrity of the system 300, correct badge, pass, and/or RFID tag and individual association, etc. The verify component 316 can utilize any suitable verification technique such as comparison of RFID tag data 302 and/or biometric data to tables and/or data including access codes, security codes, privileges, biometric data, etc. It is to be appreciated that the verify component 316 can be a stand-alone component, incorporated into the event control component 306, and/or any combination thereof.

The event control component 306 can further include an append component 318 that can append RFID data based at least in part upon an event sequence and/or control. The append component 318 can provide additional data to the received RFID data, wherein the received RFTD data with the additional appended data can be wirelessly transmitted to a disparate module 310. The disparate module 310 can include an RFID component 312 and an event control component 314. It is to be appreciated that there can be any number of modules 310, from 1 to N, where N is an integer greater than or equal to 1. Furthermore, upon receiving the RFID data with the additional appended data, the module 310 can implement an event related to the device 308. In addition, RFID component 312 and the event control component 314 can be substantially similar to the RFID component 304 and the event control component 306. Yet, it is to be appreciated that the event control component 306 can employ a first event and the event control component 314 can employ a disparate event in a later order based at least in part upon the RFID data (e.g., received by the event control component 306) and the RFID data with appended data (e.g., received by the event control component 314). It is to be appreciated and understood that the append component 318 can add new RFID data to the RFID tag 302, re-write RFID data to the RFID tag 302 and/or any combination thereof.

For example, a device can be a machine with a shut down process with a first event and a second event, wherein the second event needs to occur after the first event. The first event can be turning off power to a grid and a second event can be disabling a safety mechanism. The RFID tag 302 can transmit data, wherein the event control component 306 can receive such data via the RFID component 304. The event control component 306 can invoke the first event to occur in relation to the machine. The event control component 306 can further append the received RFID data and transmit it to a disparate module to employ the second event in relation to the machine. It is to be appreciated that the RFID data can be appended and transmitted in any number of instances in order to properly implement events and the sequences associated therewith. Moreover, it is to be appreciated that there can be any number of devices 308 and any number of events controlled and/or employed by the event control component 304.

The event control component 306 can utilize the RFID tag 302 as a uniquely and/or coded transferable electronic token providing sequential event control and//or monitoring. The system 300 can provide enforcement and/or monitoring of single or multiple step event sequences each of which can be executed in series or in parallel. Moreover, the system 300 may allow a particular person and/or group of people to initiate the sequence. The sequence initiation can require a valid code (e.g., RFID tag 302) that is allocated to a particular person. The identity of the people capable of initiating the sequence can be controlled by the range of codes that can be recognized as valid. At execution of each sequence event, the code input can be appended to form a new code output which can allow initiation of the next designated event or the reverse execution of the immediately pervious event. Furthermore, the system 300 can include a centralized function connected to the spatially separated event sequence locations by a data transmission system or by a separate read/write modules each located and mechanically otherwise interlocked or connected with one of the spatially separated event sequence mechanisms. In addition, the system 300 can use dynamic, homogeneous, and/or diverse redundancy and state monitoring for integrity enhancement.

Figure 4:
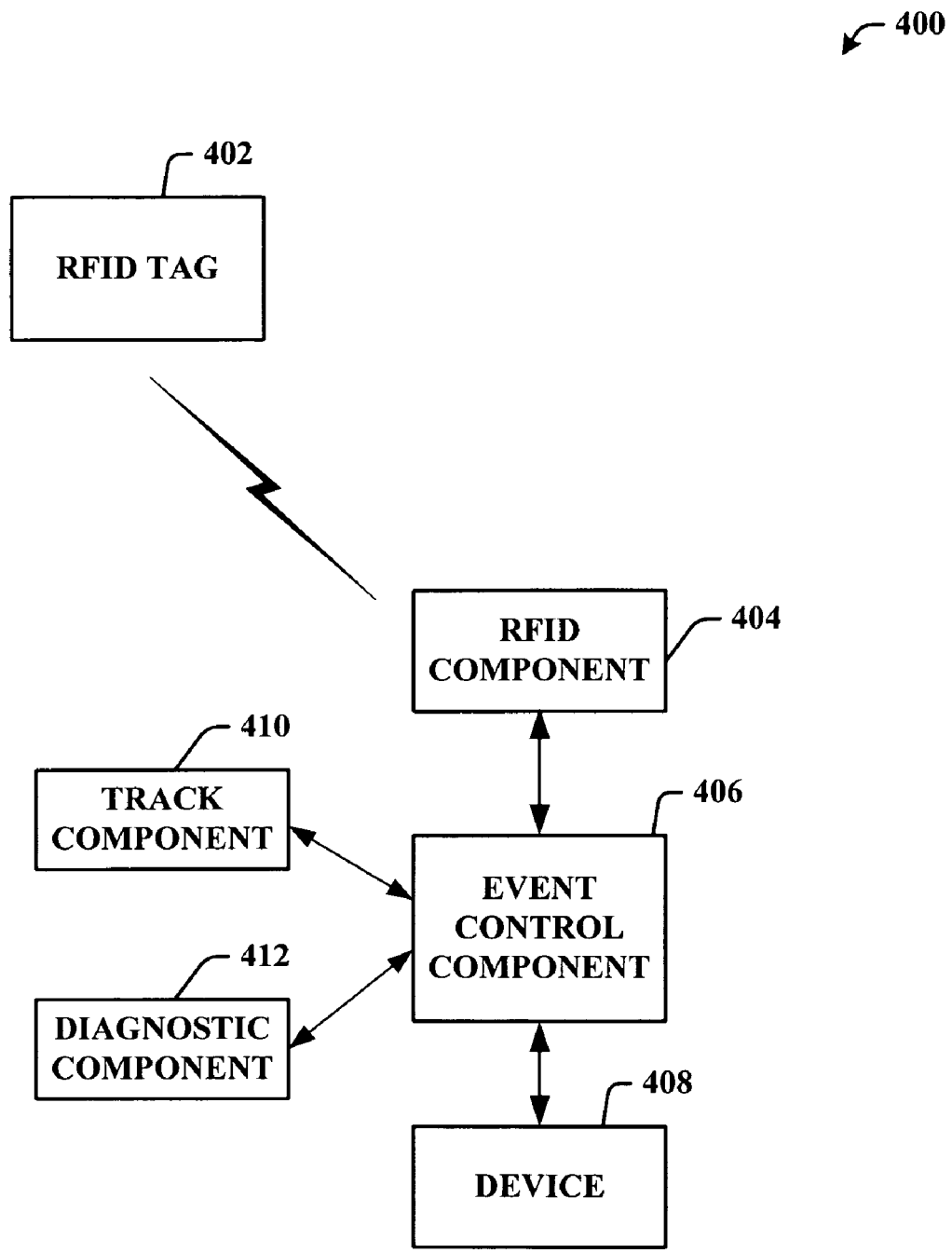
FIG. 4 illustrates a block diagram of an exemplary system that facilitates providing an event sequence control to a device utilizing RFID technology.

FIG. 4 illustrates a system 400 that facilitates providing an event sequence control to a device utilizing RFID technology. An event control component 406 can employ at least one event in a control sequence associated with a device 408 based at least in part upon an RFID tag 402, wherein such RFID tag 402 can include data that is wirelessly communicated to an RFID component 404. The event control component 406 can invoke one or more events related to the device 408 based at least in part upon the data on the RFID tag 402. The events can be associated with a particular sequence and/or order for the device 408. It is to be appreciated that the components, tags, and/or devices can be substantially similar to components, tags, and/or devices described in previous figures. Moreover, although a single RFID tag 402, a single RFID component 404, a single event control component 406, and a single device 410 are illustrated, it is to be understood that a plurality of tags, devices, and components can be utilized.

The system 400 can include a track component 410 that can track and/or monitor the location and/or proximity of the RFID tag 402. The track component 410 can utilize any wirelessly communicated data to locate the RFID tag 402 to allow for tracking of such individual and/or item utilizing the RFID tag 402. Furthermore, the track component 410 can utilize a data store (not shown) to store the tracking data. For instance, the track component 410 can provide real-time data associated to the location of the RFID tag 402. Moreover, any historic data can be logged and/or stored to allow the previous locations of the RFID tag 402 to be examined, utilized, etc. It is to be appreciated that the track component 410 can be a stand-alone component, incorporated into the event control component 406, and/or any combination thereof.

The system 400 can further utilize a diagnostic component 412 that can provide diagnostics associated with the system 400. The diagnostic component 412 can provide diagnostic functions and/or supervisory functions based on the RFID tag 402 data collection and/or processing. The diagnostic component 412 can further use dynamic, homogeneous and/or diverse redundancy and state monitoring for the enhancement of the integrity of the system 400. It is to be appreciated that the diagnostic component 412 can be a stand-alone component, incorporated into the event control component 406, and/or any combination thereof.

In one example, the RFID tag 402 can be utilized into an intelligent badge and/or pass. The intelligent badge and/or pass can read specific biometric parameters associated with an individual. Moreover, the biometric information can be transmitted along with the coded access data to the RFID component 404. Subsequently, the RFID component 404 can then relay the data and/or information to a controller (not shown) and/or other entity to confirm access. Thus, the RFID tag 402 can be assured to be utilized by the correct individual, wherein such individual can initiate an event control sequence related to the device 408.

Figure 5:
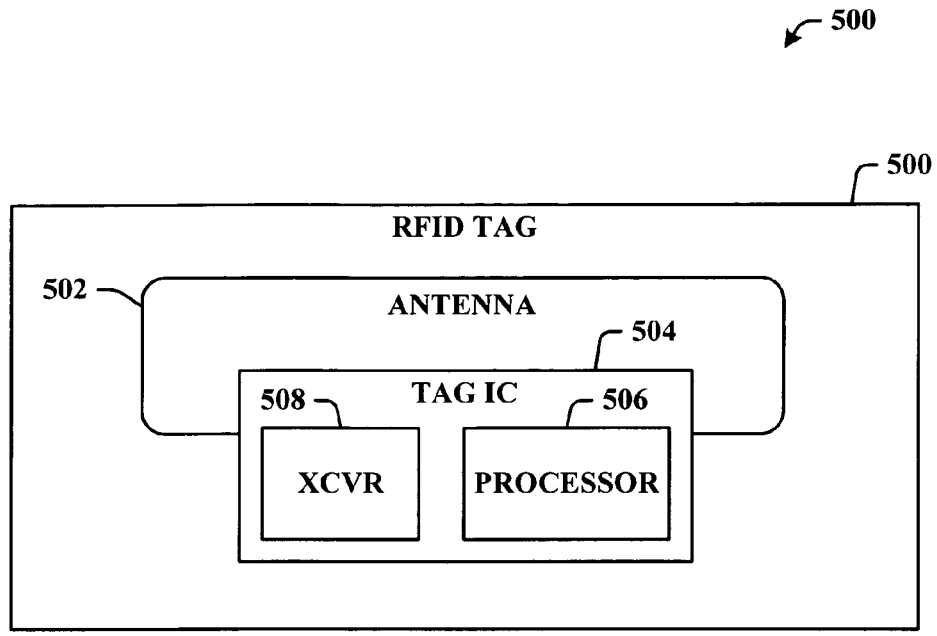
FIG. 5 illustrates an RFID tag in accordance with the claimed subject matter.

FIG. 5 illustrates an RFID tag 500 in accordance with the claimed subject matter. It is to be appreciated and understood that the tag 500 can be a passive RFID tag, and in particular a passive UHF tag. The tag 500 can include a single antenna 502 (or multiple antennas) (denoted ANTENNA) that facilitates communicating signals and data with an RFID reader (or reader/writer) (not shown). The tag 500 also includes a tag IC 504 that provides onboard processing of the data and signals. In support thereof, the tag IC 504 further includes a processor 506 (e.g., a digital signal processor-DSP) that facilitates data and signal processing and storage, and a transceiver 508 that interfaces to the antenna 502 for communications of the data and signals. It is to be appreciated that the tag 500 can be a passive tag (e.g., no internal power supply) and/or an active tag, such that a power source (not shown) (e.g., a coin cell, capacitor) is provided.

Figure 6:
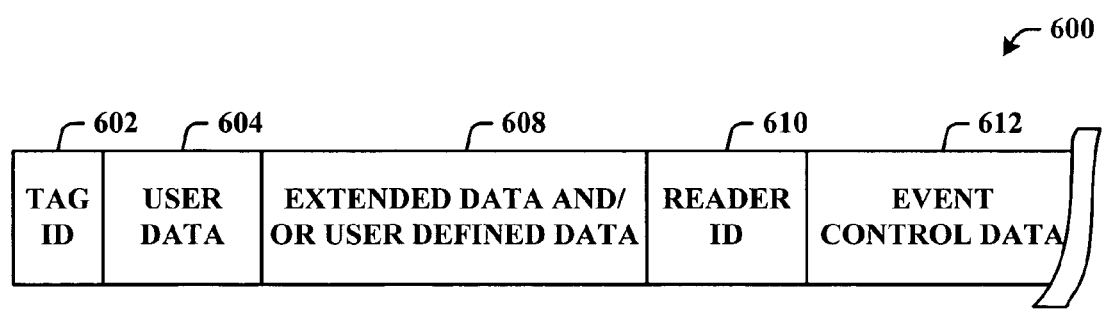
FIG. 6 illustrates an exemplary RFID data packet that includes identification and/or event control data which can be utilized to provide controlling events within a particular order in relation to a device.

FIG. 6 illustrates an exemplary RFID data packet 600 that includes identification and/or event control data which can be utilized to provide controlling events within a particular order in relation to a device. The RFID data packet 600 can be related to a passive RFID tag, and in particular a passive UHF tag. The packet 600 can include a tag ID 602 that uniquely identifies the tag; however, this is not a requirement. User data 604 is included that describes the user and/or badge/pass to which the RFID tag is attached or associated. The packet 600 also includes extended data and/or user defined data 608. The extended data and/or user defined data 608 can be utilized to encode information that can be utilized by an event control component, controller, and/or device to provide at least one of an event control sequence. For example, the extended data and/or user defined data 608 can be related to an event sequence, an event, a sequence, access level, plant and/or factory geographic area, contact information (e.g., email, emergency contact info, cellular phone number, address, etc.), company information, position and/or title information, etc. Reader ID data 610 can be received from the reader from which the generated frequency can be known to verify tag and/or reader capability. Additional event control data 612 can also be communicated. Other data can also be communicated via the packet 600, according to the particular application, process, device, and/or event control sequence implemented.

Figure 7:
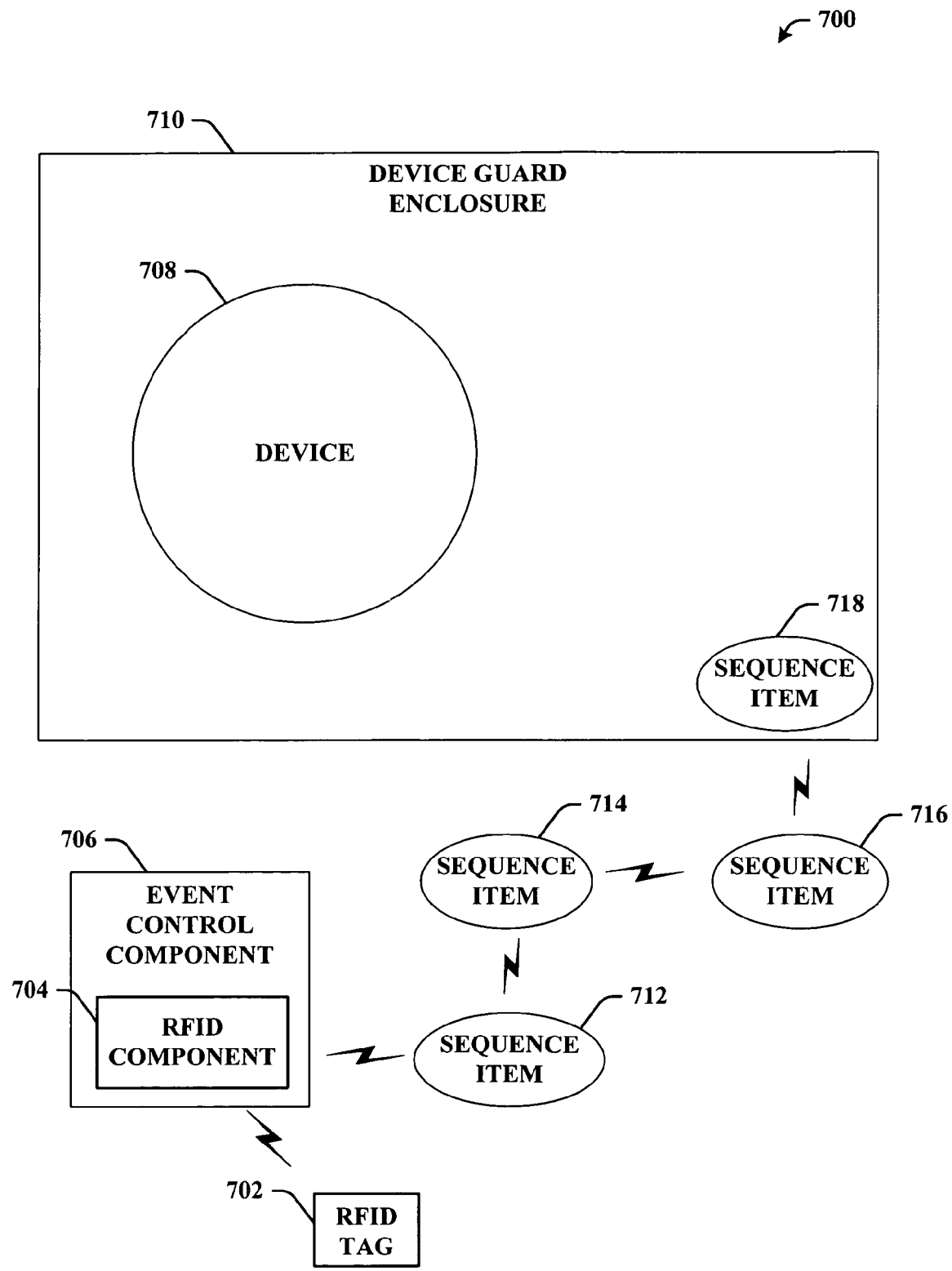
FIG. 7 illustrates an application of an RFID event control sequence system in accordance with at least one aspect of the claimed subject matter.

FIG. 7 illustrates an application of an RFID event control sequence system 700 in accordance with at least one aspect of the claimed subject matter. An RFID tag 702 can be incorporated and/or embedded with a badge and/or pass associated with an industrial automation environment. The RFID tag 702 can wirelessly transmit data to an RFID component 704, wherein an event control component 706 can utilized such data to initiate at least one event associated with a device 708. It is to be appreciated that the RFID component 704 can be, but is not limited to, various components that read, write, receive, and/or store electronic product data, such as, readers, writers and/or servers, and can be a handheld device, incorporated into the device 708, a badge, a badge, a pass, an identification card, an access pass, a keycard, a nametag, and a driver's license, an identification item, or a fixed-mount device depending on the particular application and/or location within an industrial automation environment. The event can be any suitable event related to the device 708 that can be initiated in a particular sequence and/or order. The device 708 can be within a device guard enclosure 710, wherein various events can be invoked.

In one example, the RFID tag can wireless transmit data, wherein such data can be pre-defined to initiate a particular event and/or multiple events in association with the device. The event and/or events can include at least one item that is sequenced. For example, the receipt of an appropriate RFID tag 402 can initiate a sequence item 712 to occur. The data received can then be appended and transmitted to provide a sequence item 714 to be provided, wherein the data received can be appended again to initiate a sequence item 716 to occur. The received data can then be received and appended to employ a sequence item 718. It is to be appreciated that any number of sequenced items can be included with an event and/or a plurality of events associated with the device 708. For instance, sequence item 712 can be electrical power, sequence item 714 can be pneumatic power, sequence item 716 can be machine guard door lock, and sequence item 718 can be enable limited pneumatic power. In other words, a person with a designated level of access privileges can be access into the device guard enclosure 710 but a person without those access privileges cannot.

Figure 8:
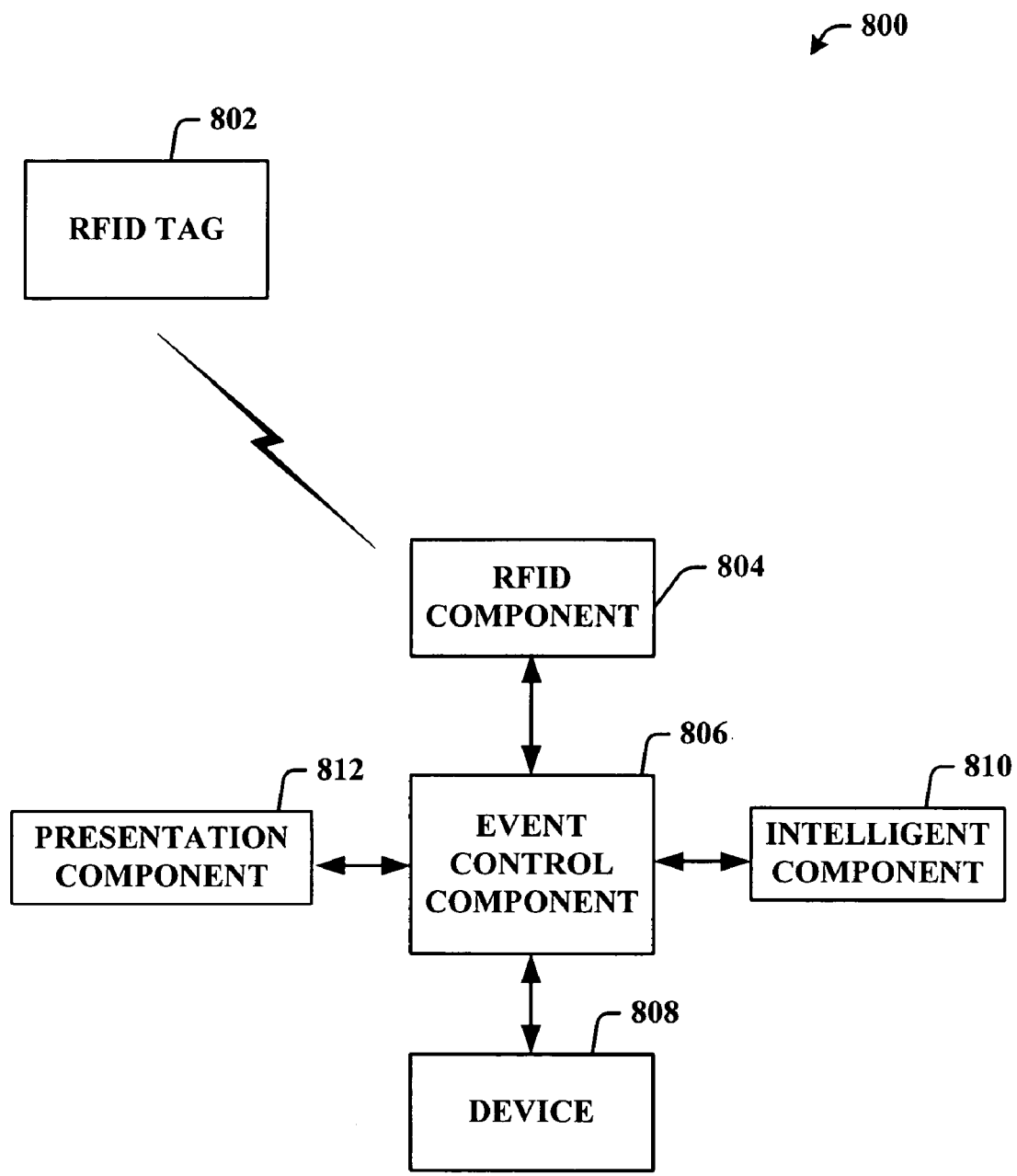
FIG. 8 illustrates a block diagram of an exemplary system that facilitates employing an event control sequence based at least in part upon an RFID tag.

FIG. 8 illustrates a system 800 that facilitates employing an event control sequence based at least in part upon an RFID tag. The system 800 can employ intelligence to facilitate utilizing RFID tag data to implement at least one sequenced event associated with a device 808. The system 800 can include an RFID tag 802, an RFID component 804, a device 808, and an event control component 806 that can all be substantially similar to respective components, devices, and tags described in previous figures. Moreover, it is to be appreciated that there can be any number of RFID tags 802, RFID components 804, event control components 806, and/or devices.

The system 800 further includes an intelligent component 814. The intelligent component 814 can be utilized by the safety component 806 to facilitate employing one or more events in a particular order and/or sequence (e.g., in series and/or in parallel, and/or any combination thereof). For example, the intelligent component 814 can infer the event control sequence, events, sequences, devices associated with events, RFID codes, electronic token numbers, authorization, appended codes, appending RFID tags, etc. It is to be appreciated that the intelligent component 814 can be a stand-alone component, incorporated into the event control component 806, and/or any combination thereof.

It is to be understood that the intelligent component 810 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 812 can provide various types of user interfaces to facilitate interaction between a user and any component associated with the system 800. As depicted, the presentation component 812 is a separate entity that can be utilized with the event control component 806. However, it is to be appreciated that the presentation component 810 and/or similar view components can be incorporated into the event control component 806 and/or a stand-alone unit. The presentation component 812 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the event control component 806.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
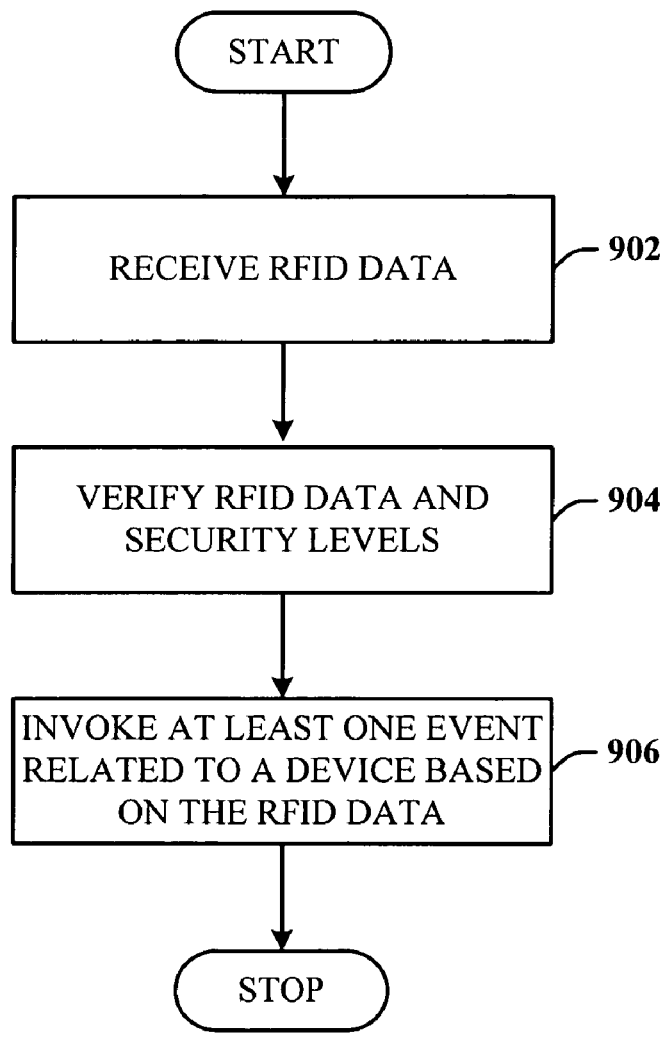
FIG. 9 illustrates a methodology that facilitates implementing an event control sequence related to a device within an industrial automation environment.
Figure 10:
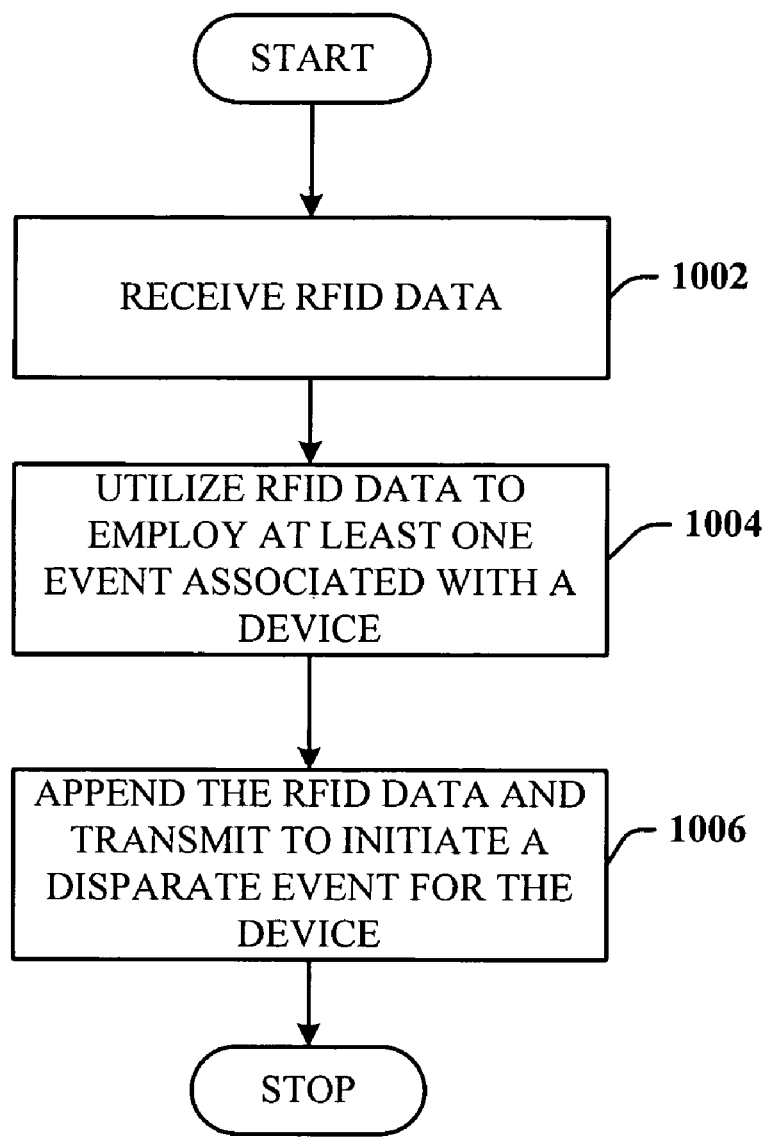
FIG. 10 illustrates a methodology that facilitates employing an event control sequence based at least in part upon an RFID tag.
Figure 11:
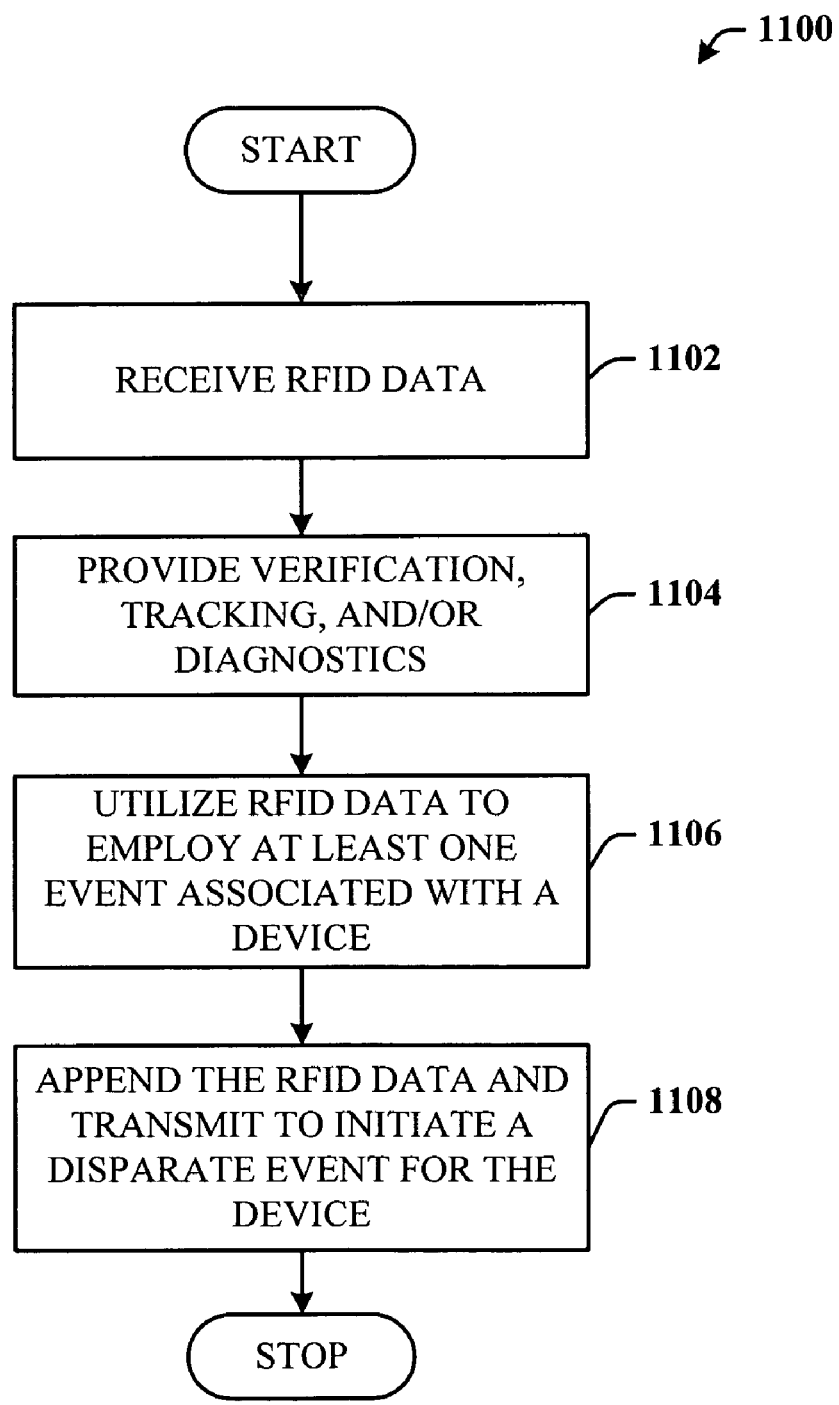
FIG. 11 illustrates a methodology for invoking at least one event related to a control sequence associated with a device utilizing a plurality of RFID signals in series and/or parallel.

FIGS. 9-11 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

FIG. 9 illustrates a methodology 900 for implementing an event control sequence related to a device within an industrial automation environment. At reference numeral 902, RFID data can be received by the RFID component. The RFID component can be, but is not limited to, various components that read, write, receive, and/or store electronic product data, such as, readers, writers and/or servers, and can be a handheld device, incorporated into a device, a badge, an identification item, or a fixed-mount device depending on the particular application and/or location within an industrial automation environment. It is to be appreciated and understood that the RFID component can receive data from an RFID tag which can be a passive RFID tag, and in particular a passive UHF tag. Moreover, it is to be appreciated that the RFID tag can include any suitable data associated with, but not limited to, identification, event sequences, location, biometrics, access, security, personal data, emergency contacts, automation environment, etc. At reference numeral 904, the RFID data and a security level can be verified. For instance, a particular RFID tag can be linked with various security rights and/or privileges.

At reference numeral 906, at least one event can be invoked based at least in part upon the RFID tag and respective data, wherein the event can be associated with a device. The event can be a controlled sequential event that can be initiated by the wireless receipt of a particular RFID data. For instance, a security level can be associated with a right to invoke a particular event and/or group of events for the device. The event can be, but is not limited to, device shut down, device access procedures, valve sequencing, exhaust sequencing, heat sequencing, device powering up, and/or any other suitable sequential process associated with a device and/or process within an industrial automation environment. The device can include any suitable device within an industrial automation environment that can pose a threat, danger, and/or hazardous condition. For example, the device can be, but is not limited to, a blade, a door, a press, a robot, welder, a machine, a roller, a welder, a laser, a scanner, a belt conveyor, a pump, a press, a fan, a fly-wheel, a movable machine part, a vent for harmful fumes, a drain for harmful material, a heat source, a cold source, a container with a material (e.g., safe mode allows material to be maintained at a safe level), an electrical source, etc.

FIG. 10 illustrates a methodology 1000 that facilitates employing an event control sequence based at least in part upon an RFID tag. At reference numeral 1002, RFID data can be received by an RFID component from an RFID tag. At reference numeral 1004, RFID data can be utilized to employ at least one event associated with a device. The event can be a controlled sequence event, wherein the RFID data can trigger the initiation of at least one event associated with the device. For instance, the RFID data can invoke the first step in a machine shut down and/or access procedure. The RFID component can be, but is not limited to, various components that read, write, receive, and/or store electronic product data, such as, readers, writers and/or servers, and can be a handheld device, incorporated into a device, a badge, an identification item, or a fixed-mount device depending on the particular application and/or location within an industrial automation environment.

At reference numeral 1006, the RFID data can be appended and re-transmitted to invoke a disparate event for the device. By appending the RFID data and re-transmitting the data, a sequence associated with the device can be ensured. Moreover, it is to be appreciated that the RFID data can be appended, re-written, and/or any combination thereof in order to invoke an ordered sequence of events related to the device. In addition, it is to be appreciated that there can be any number of events that can be initiated by appending RFID data and re-transmitting such data.

FIG. 11 illustrates a methodology 1100 for invoking at least one event related to a control sequence associated with a device utilizing a plurality of RFID signals. At reference numeral 1102, RFID data can be received. At reference numeral 1104, at least one of verification, tracking, and diagnostics can be provided. The RFID data can be utilized to ascertain a location, wherein tracking can be employed. Moreover, the verification of the RFID data can be implemented by ensuring RFID data is associated with a particular level of security, privileges, and/or rights. The RFID data can also be utilized to provide diagnostic functions in connection with the industrial automation environment.

At reference numeral 1106, RFID data can be utilized to invoke at least one event associated with a device. The event can be a controlled sequence event, wherein the RFID data can trigger the initiation of at least one event associated with the device. The device can include any suitable device within an industrial automation environment that can have a sequential process and/or events associated therewith. At reference numeral 1108, the RFID data can be appended and re-transmitted to invoke a disparate event for the device. By appending the RFID data and re-transmitting the data, a sequence associated with the device can be ensured. Moreover, it is to be appreciated that the RFID data can be appended, re-written, and/or any combination thereof.

Figure 12:
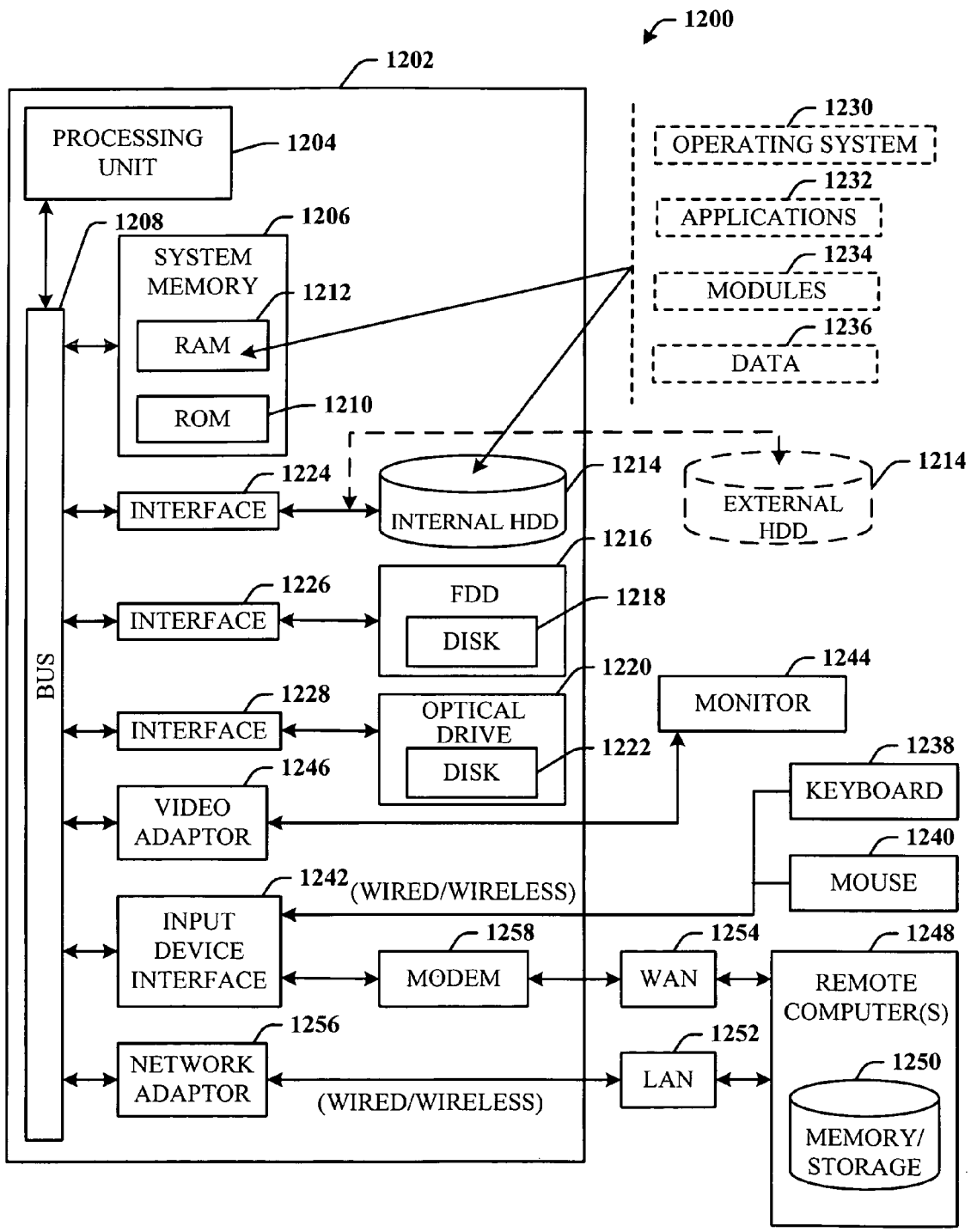
FIG. 12 illustrates a block diagram of a computer operable to execute the disclosed architecture.
Figure 13:
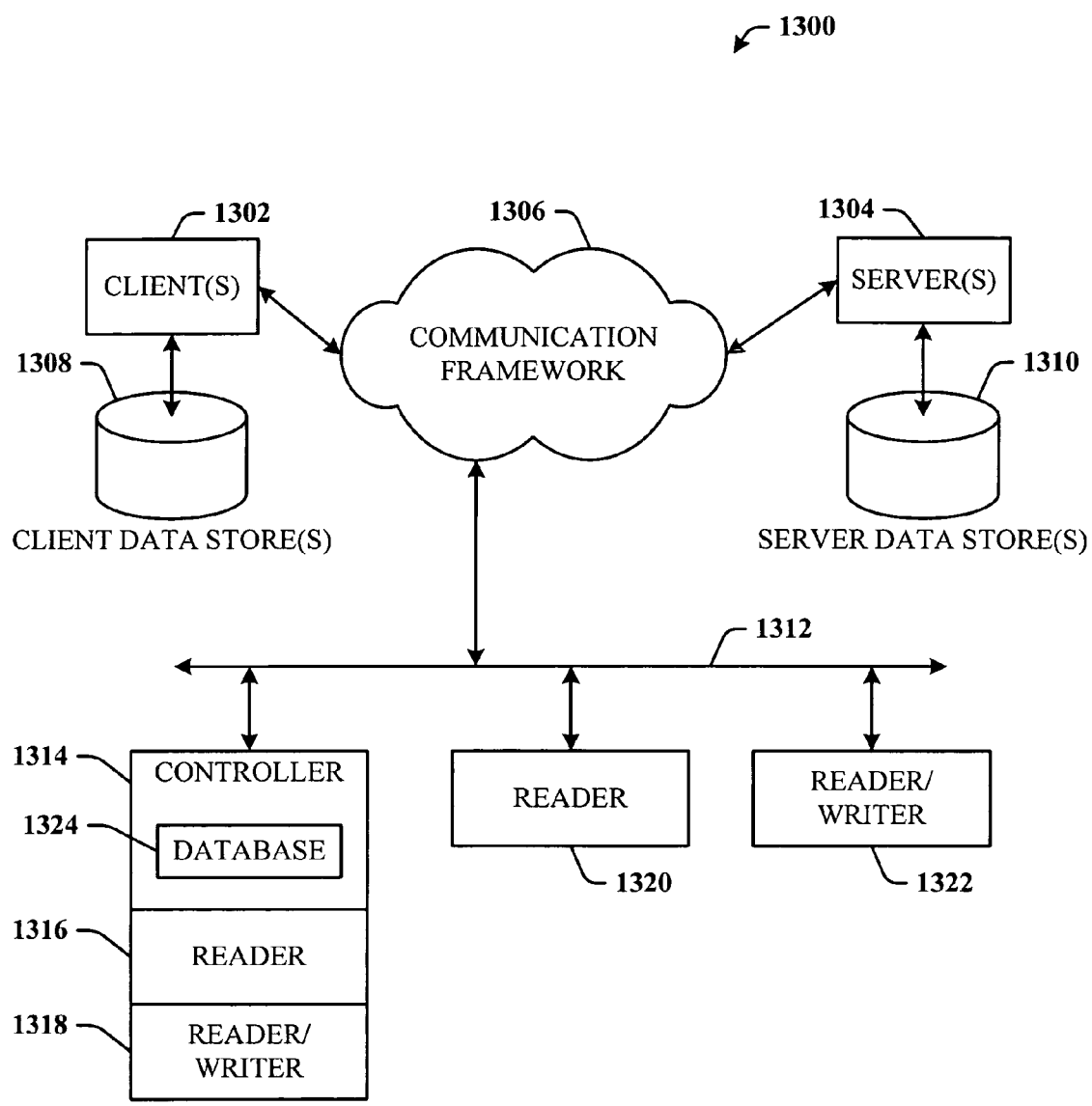
FIG. 13 illustrates a schematic block diagram of an exemplary computing environment in accordance with the claimed subject matter.

In order to provide additional context for implementing various aspects of the claimed subject matter, FIGS. 12-13 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the invention includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216, and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1094 interface technologies. Other external drive connection technologies are within contemplation of the subject invention.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234, and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1094 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device, or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

The framework 1306 can also include a subnetwork 1312, for example, that can be implemented as in an assembly line environment. The subnetwork 1312 can have disposed thereon as nodes, a controller 1314 (e.g., a PLC) that controls a reader module 1316 and a reader/writer module 1318 both of which can read RFID tags, and the latter of which can write data to the RFID tags. The controller 1314 can include an internal database 1324 to store RFID tag data information as described above. The controller 1314, reader module 1316 and reader/writer module 1318 can be provided in a rack configuration at selected locations. Alternatively or in combination therewith, the subnetwork 1312 can also include a second reader module 1320 as a wired or wireless node (or client) that is positioned (fixed or mobile) to read RFD tags, as needed. Similarly, the subnetwork 1312 can also support a reader/writer module 1322 as a wired and/or wireless client node for reading and writing data and signals to RIFD tags that come within a coverage area.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates initiating a sequence within an industrial automation environment, comprising:
   a radio frequency identification (RFID) component that receives data from an RFID tag; and
   an event control component that invokes at least one event related to a device in a designated control sequence based upon the received data, the event control component further comprising an append component that appends additional data to the received data such that the appended data initiates a disparate event from the received RFID tag data.

2. The system of claim 1, wherein the RFID component is at least one of an RFID reader, an RFID writer, or an RFID reader/writer.

3. The system of claim 1, wherein the device is at least one of the following: a blade; a door; a press; a robot; welder; a machine; a roller; a welder; a laser; a scanner; a belt conveyor; a pump; a press; a fan; a fly-wheel; a movable machine part; a vent for harmful fumes; a drain for harmful material; a heat source; a cold source; a container with a material; a machine; or an electrical source.

4. The system of claim 1, wherein the RFID tag is a passive ultra high frequency (UHF) RFID tag.

5. The system of claim 4, wherein the RFID tag is associated with at least one of a badge, a pass, an identification card, an access pass, a keycard, a nametag, or a driver's license.

6. The system of claim 5, wherein the RFID tag includes biometric data that is at least one of an inductance, retina data, iris data, a facial pattern, a hand measurement, a fingerprint, or a voice pattern.

7. The system of claim 1, wherein the event control component provides at least one of an approval or a denial in association with invoking the at least one event.

8. The system of claim 1, further comprising a controller that controls the device based at least in part upon the event implemented.

9. The system of claim 8, wherein the controller directly controls the device based at least in part upon the wirelessly received data within the RFID tag.

10. The system of claim 1, wherein the event is at least one of the following: a safety shutdown; a slow mode; a non-movement mode; a non-normal operation mode; a normal operation mode; a power down; a power up; a sequential process for the device; a device access procedure; a valve sequencing; an exhaust sequencing; a heat sequencing; or a stepping mode.

11. The system of claim 1, wherein the event is invoked in at least one of in series or in parallel.

12. The system of claim 1, the event control component re-transmits the appended data to invoke a disparate event related to the device.

13. The system of claim 1, further comprising a verify component to employ a verification technique to ensure the RFID tag is associated with a correct entity.

14. The system of claim 1, further comprising a track component that can provide at least one of tracking the RFID tag and monitoring the event within the designated control sequence.

15. The system of claim 1, further comprising a diagnostic component that provides diagnostics associated with at least one of the designated control sequence, a process related to the device, the device, or the at least one event.

16. The system of claim 1, wherein the event control component utilizes at least one of dynamic, homogeneous, diverse redundancy, or state monitoring to enhance integrity.

17. The system of claim 1, wherein the RFID tag includes at least one of a tag identification, event sequence data, event control data, user data, extended data, user defined data, reader identification, security data, location data, biometric data, access data, personal data, or automation environment data.

18. The system of claim 1, wherein the event control component is at least one of a centralized function connected to a spatially separated event locations by a data transmission system or a separate read/write module located with one of the spatially separated event sequence mechanism.

19. A method that facilitates invoking a control sequenced event within an industrial automation environment, comprising:
  receiving data at a radio frequency identification (RFID) component from an RFID tag;
  decoding and translating the received data from the RFID tag;
  invoking at least one event in a designated control sequence related to a device based on the received RFID tag data;
  appending additional data to the received data from the RFID tag; and
  re-transmitting the appended RFID tag data to invoke a disparate event within the designated control sequence.

20. The method of claim 19, further comprising: verifying an entity utilizing the RFID tag with biometric data.

21. The method of claim 19, further comprising:
  storing an access level to the RFID tag respective to a status of the entity; and
  allowing at least one of an approval and a denial to invoke an event based on the access level.

22. The method of claim 19, wherein the RFID component is at least one of an RFID reader, an RFID writer, or an RFID reader/writer.

23. The method of claim 19, wherein the device is at least one the following: a blade; a door; a press; a robot; welder; a machine; a roller; a welder; a laser; a scanner; a belt conveyor; a pump; a press; a fan; a fly-wheel; a movable machine part; a vent for harmful fumes; a drain for harmful material; a heat source; a cold source; a container with a material; or an electrical source.

24. The method of claim 19, wherein the RFID tag is a passive ultra high frequency (UHF) RFID tag.

25. A system that facilitates invoking a control sequenced even within an industrial automation environment, comprising:
  means for receiving data from an RFID tag;
  means for invoking at least one event related to a device in a designated control sequence based on the received data; and
  means for appending the data received from the RFID tag, the appended data invoking a disparate event from the received RFID tag data.

* * * * *

UNITED STATES PATENT AND TRADEMARK OFFICE
CERTIFICATE OF CORRECTION

PATENT NO. : 7,616,095 B2  Page 1 of 1
APPLICATION NO. : 11/360082
DATED : November 10, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 915 days.

Signed and Sealed this

Nineteenth Day of October, 2010

David J. Kappos
*Director of the United States Patent and Trademark Office*